United States Patent [19]
Mathis

[11] 3,912,686
[45] Oct. 14, 1975

[54] NICKEL COMPLEX-HYDROXYBENZOTRIAZOLE STABILIZER SYSTEM FOR POLYOLEFINS

[75] Inventor: Ronald D. Mathis, Taylors, S.C.

[73] Assignee: Phillips Petroleum Company, Bartlesville, Okla.

[22] Filed: Apr. 1, 1974

[21] Appl. No.: 456,839

[52] U.S. Cl. 260/45.75 N; 260/45.8 NT; 260/45.85 B
[51] Int. Cl.² ............................................ C08F 6/00
[58] Field of Search 260/45.75 N, 45.8 NT, 45.85 B

[56] References Cited
UNITED STATES PATENTS
3,464,943  9/1969  Newland et al. ................ 260/45.85
3,692,738  9/1972  Mathis et al. .................... 260/45.75

*Primary Examiner*—V. P. Hoke

[57] ABSTRACT

The resistance of polyolefins to ultraviolet light degradation is improved by incorporating into the polyolefin a nickel complex formed from a partially halogenated beta-diketone, such as nickel, 1,1,1-trifluoro-7-methyl-2,4-octanedione, for example, and a 2-hydroxybenzotriazole, such as 2(2'-hydroxy-3',5'-di-t-amylphenyl)benzotriazole, for example.

8 Claims, No Drawings

NICKEL COMPLEX-HYDROXYBENZOTRIAZOLE STABILIZER SYSTEM FOR POLYOLEFINS

The stabilization of polyolefins with small quantity of additives to improve the resistance of the polyolefins to ultraviolet light degradation is well known. Unfortunately, many of the useful additives impart undesirable color to the polyolefins. In accordance with this invention, a particularly useful stabilizing system is provided, which comprises a nickel complex formed from a partially halogenated beta-diketone in combination with a 2-hydroxybenzotriazole. The nickel compound can be employed in relatively small amounts to minimize color formation in the polyolefin.

The polyolefins which are stabilized in accordance with this invention include normally solid homopolymers of olefins, copolymers of olefins and mixtures of such homopolymers and/or copolymers. In general, these polyolefins are produced from olefins having from 2 to 8 carbon atoms per molecule. Examples of such polyolefins include polyethylene, polypropylene, poly (1-butene), poly(4-methylpentene-1), propylene-/ethylene copolymers, ethylene/1-butene copolymers, ethylene/1-hexene copolymers, ethylene/1-octene copolymers, and the like, and mixtures thereof.

The halogenated beta-diketones which are employed in the form of nickel complexes can be represented by the formula

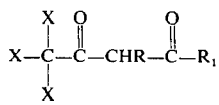

wherein X is a halogen selected from the group consisting of fluorine, bromine, chlorine and iodine; R is hydrogen or a radical selected from alkyl, aryl, cycloalkyl, and combinations of those radicals containing up to 20 carbon atoms or a heterocyclic radical containing 5 or 6 atoms per ring; and $R_1$ is a radical selected from alkyl, aryl, cycloalkyl and combinations thereof containing up to 20 carbon atoms or a heterocyclic radical containing 5 to 6 atoms per ring. Compounds exemplary of such halogenated beta-diketones are 1,1,1-trifluoro-2,4-pentanedione, 1,1,1-trifluoro-5,5-dimethyl-2,4-hexanedione, 4,4,4-triiodo-1(2-thienyl)-1,3-butanedione, 1,1,1-trifluoro-7-methyl-2,4-octanedione, 1,1,1-tribomo-8-ethyl-2,4-dodecanedione, 1,1,1-trifluoro-2,4-tetracosanedione, and the like. The nickel complex of the halogenated betadiketones can be prepared according to the methods set forth in U.S. Pat. No. 3,692,738.

The 2-hydroxybenzotriazole compounds can be represented by the formula

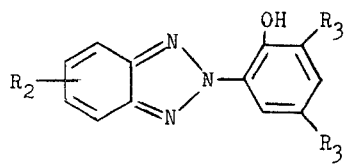

wherein $R_2$ is hydrogen or a halogen as described above; and $R_3$ and $R_4$ are independently hydrogen or an alkyl radical having from 1 to about 20 carbon atoms, preferably from about 1 to about 8 carbon atoms. Compounds exemplary of such 2-hydroxybenzotriazole compounds include 2-(2'-hydroxy-5'-t-octylphenyl)-5-chlorobenzotriazole, 2-(2'-hydroxy-3'-methylphenyl)-benzotriazole, 2-(2'-hydroxy-3'-dodecyl-5'-methylphenyl)benzotriazole, 2-(2'-hydroxy-3', 5'-di-t-amylphenyl)benzotriazole, 2-(2'-hydroxy-5'-eicosylphenyl)benzotriazole, and the like.

Other additives can be admixed with the compositions produced by the method of this invention. These include pigments, dyes, antistatic agents, processing aids such as calcium stearate, other stabilizers such as diesters of beta,beta'-thiodipropionic acid (i.e., dilaurylthiodipropionate, distearylthiodipropionate), and the like. It is often desirable to include an antioxidant for the purpose of providing heat stability during subsequent processing of the composition, for example, during extruding and melt spinning. Suitable antioxidants include hindered phenols selected from the group consisting of 2,6-di-t-butyl-4-methylphenol, tetrakis[-methylene(3,5-di-t-butyl-4-hydroxyhydrocinnamate)]methane, octadecyl[3-(3,5-di-t-butyl-4-hydroxyphenyl]propionate, di-n-octadecyl(3,5-di-t-butyl-4-hydroxybenzyl)phosphonate, 1,3,5-trimethyl-2,4,6-tris(3,5-di-t-butyl-4-hydroxybenzyl)benzene, 2,-2'-methylene-bis(6-t-butyl-4-methylphenol), and the like.

The polyolefins established by the method of this invention can be utilized for their usual purposes including films, sheets, fibers, laminates and molded objects.

The nickel complex of the halogenated beta-diketone hereafter referred as to the "nickel complex" and the 2-hydroxybenzotriazole hereinafter referred to as the "triazole", are employed in a weight ratio within the range of from about 1:9 to about 3:2, preferably from about 1:4 to about 1:1. The nickel complex and the triazole can be incorporated into the polymer individually, with either being incorporated first, or as a mixture. In addition, mixtures of the nickel complexes and triazoles can be employed as long as the weight ratio of the total amounts of the two types of materials are within the specified ranges.

The stabilizer, comprising the nickel complex and the triazole, will be employed in stabilizing amounts, generally within the range of from about 0.05 to about 5 parts by weight, preferably from about 0.1 to about 2 parts by weight per hundred parts of the polyolefin. The quantity of antioxidant incorporated in the polyolefin can range from about 0.005 to about 2.5 parts by weight per hundred parts of polymer, preferably from about 0.02 to about 1 part per hundred parts of polymer.

The stabilizer and the antioxidant, as well as the other additives, can be incorporated into the polyolefin individually in any order, or as mixtures according to usual procedures. These include the use of the additives in the forms of powders, solutions, slurries and pellets, the incorporation being accomplished by use of apparatus such as roll mills, Banbury mixers, Brabender Plastographs, extruders and the like. The polyolefins can be in either solid powder form or molten during incorporation with the resulting blends being processed by extrusion and pelleting, and the like.

The aforementioned U.S. Pat. No. 3,692,738 discloses use of the nickel complexes, which form one component employed in this invention, in ultraviolet stabilization systems for polyolefins. Also, the use of triazoles for polyolefin stabilizers is known, see U.S. Pat. No. 3,271,339. However, it has been found that mixtures of these known additives in the defined weight ratios result in polyolefins which are more stable to ultraviolet light than would be expected based on the additive effect of the individual compounds. These unexpected results are illustrated by the following examples.

EXAMPLE I

Polypropylene compositions containing nickel 1,1,1-trifluoro-7-methyl-2,4-octanedione, designated A, and 2-(2'-hydroxy-3',5'-di-t-amylphenyl)benzotriazole, designated B, both individually and in specified amounts were prepared.

The compositions were prepared using a 3 melt flow polypropylene (ASTM D1238-62T, Condition L), melting point about 340° F., optically determined. The polypropylene contained 0.05 part by weight (php) of Irganox 1076, octadecyl[3-(3,5-di-t-butyl-4-hydroxyphenyl)]propionate, per 100 parts of polymer. The stabilizers A and B were added in a n-hexane solution.

Each blend was mixed by mastication in a Brabender Plastograph at 200° C. for 5 minutes under a nitrogen atmosphere. Each sample was compression molded into a 5-mil thick film. Specimens, three-eighths inch wide and 2½ inches long, were cut from the film samples and tested in an Atlas Weather-Ometer containing twin-enclosed carbon arcs in which exposure to the radiation was at an angle of about 90°, the Weather-Ometer being modified by disconnecting the water-spray cycle and adding eight 20-watt Westinghouse fluorescent sunlamps according to the procedure described in *Anal. Chem.* 25, 460 (1953).

Specimens were exposed in triplicate and were tested for failure every 20 hours by subjecting each film strip to a rolling motion such that the entire length of the film strip was bent approximately 180°.

The results are set forth below. Failure is that time in hours required to sufficiently embrittle a specimen so that it broke under the previously described procedure. The term php designates parts per hundred parts by weight of polypropylene.

| Run | Stabilizer | Amount, php | Hours to Failure[a] |
|---|---|---|---|
| 1 | A | 0.5 | 433 |
| 2 | B | 0.5 | 213 |
| 3 | A+B | 0.35+0.15 | 427 |
| 4 | A+B | 0.25+0.25 | 420 |
| 5 | A+B | 0.15+0.35 | 553 |

[a]Average of the triplicate film specimens.

The above data demonstrate that the mixture of Run 5 gave better stability than the same total amount of either stabilizer alone.

EXAMPLE II

Under the same conditions as employed in Example I, the series of tests set forth were carried out. The polypropylene was nominal 3 melt flow material containing 0.05 php Irganox 1076. Results were as follows:

| Run | Concentration, php B | Concentration, php A | Hours to Failure Actual | Hours to Failure Calculated[c] | Difference Hours |
|---|---|---|---|---|---|
| 6 | 0 | 0 | 80 | — | — |
| 7 | 0.15 | 0 | 127 | — | — |
| 8 | 0.25 | 0 | 140 | — | — |
| 9 | 0.30 | 0 | 145[b] | — | — |
| 10 | 0.35 | 0 | 153 | — | — |
| 11 | 0.40 | 0 | 158[b] | — | — |
| 12 | 0 | 0.10 | 138[b] | — | — |
| 13 | 0 | 0.15 | 187 | — | — |
| 14 | 0 | 0.20 | 240[b] | — | — |
| 15 | 0 | 0.25 | 293 | — | — |
| 16 | 0 | 0.35 | 387 | — | — |
| 17 | 0.15 | 0.35 | 407 | 434 | −27 |
| 18 | 0.25 | 0.25 | 427 | 353 | +74 |
| 19 | 0.30 | 0.20 | 467 | 305 | +162 |
| 20 | 0.35 | 0.15 | 533 | 260 | +273 |
| 21 | 0.40 | 0.10 | 440 | 216 | +220 |

[b]These values were not actually measured. Instead, the three actual measured values of each constituent alone were plotted as functions of concentrations. Two substantially straight line curves were obtained, from which the indicated values were extrapolated.

[c]Based on a summation of the measured (or extrapolated) values of the corresponding concentrations of the two constituents, minus 80 (the control with no additive), the hours to failure of the control run with neither constituent.

These data demonstrate that the hours to failure of the polyolefin samples containing a blend of the two components at the relative concentrations of Runs 18, 19, 20 and 21 exceeded the expected hours to failure based on the additive effect of the individual constituents alone.

In addition to the unexpected increase in ultraviolet resistance afforded the polyolefin by the mixture of compounds in accordance with this invention, a second important advantage lies in the reduced color imparted to the resin compositions. Inasmuch as nickel compounds are colored, they impart a color to the resin. By sunstituting the comparative colorless or lightly colored triazole for a portion of the nickel compound, a less highly colored resin composition results.

While this invention has been described in conjunction with presently preferred embodiments, it should be apparent that it is not limited thereto.

What is claimed is:

1. A composition comprising polypropylene having ultraviolet light stabilizing amounts of first and second materials incorporated therein, said first material comprising at least one nickel complex of a halogenated betadiketone of the formula

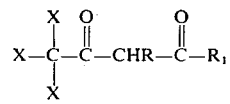

where each X is fluorine, bromine, chlorine or iodine, R is hydrogen or a radical selected from alkyl, aryl, cycloalkyl and combinations thereof containing up to 20 carbon atoms or a heterocyclic radical containing 5 or 6 carbon atoms per ring, and $R_1$ is a radical selected from alkyl, aryl, cycloalkyl and combinations thereof containing up to 20 carbon atoms or a heterocyclic radical containing 5 or 6 carbon atoms per ring, said second material comprising at least one compound of the formula

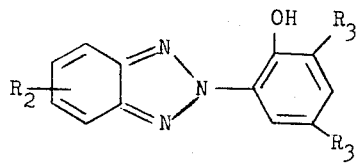

in which $R_2$ is hydrogen, fluorine, bromine, chlorine or iodine, and each $R_3$ is hydrogen or an alkyl having up to 20 carbon atoms, the weight ratio of said first material to said second material being in the range of about 1:9 to about 3:2.

2. The composition of claim 1 wherein the total amount of said first and second materials comprises about 0.05 to about 5 parts by weight per 100 parts polypropylene.

3. The composition of claim 2 wherein the weight ratio of said first material to said second material is in the range of about 1:4 to about 1:1.

4. The composition of claim 3 wherein said first material comprises nickel trifluoro-7-methyl-2,4-octanedione and said second material comprises 2(2'-hydroxy-3',5'-di-t-amylphenyl)benzotriazole.

5. The composition of claim 1 wherein said first material comprises nickel trifluoro-7-methyl-2,4-octanedione and said second material comprises 2(2'-hydroxy-3',5'-di-t-amylphenyl)benzotriazole.

6. The composition of claim 5 wherein the total amount of said first and second materials comprises about 0.05 to about 5 parts by weight per 100 parts of polypropylene.

7. The composition of claim 6, further including an antioxidant in the range of about 0.005 to about 2.5 parts by weight per 100 parts of polypropylene.

8. The composition of claim 7 wherein the antioxidant is octadecyl[3-(3,5-di-t-butyl-4-hydroxyphenyl)]-propionate.

* * * * *